Aug. 10, 1937.                B. G. HILL                2,089,607
                        AXLE CONTROLLING DEVICE
                        Filed Nov. 26, 1935
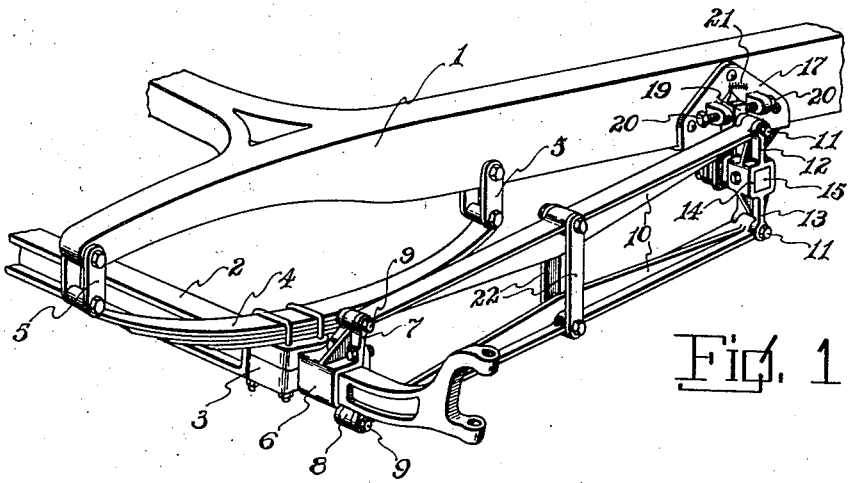
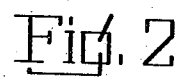
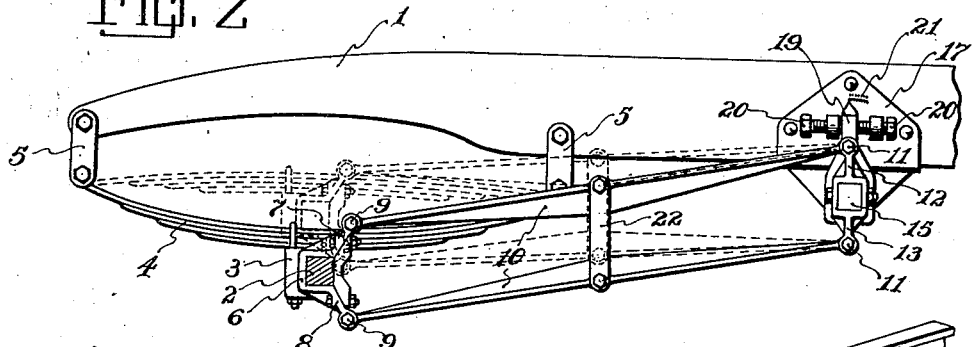
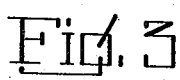
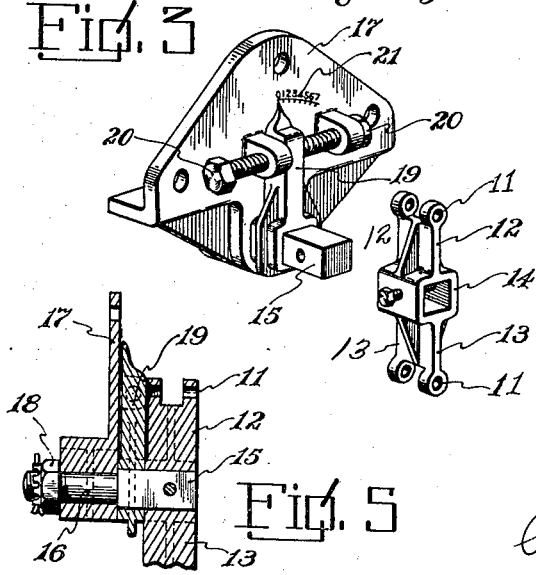
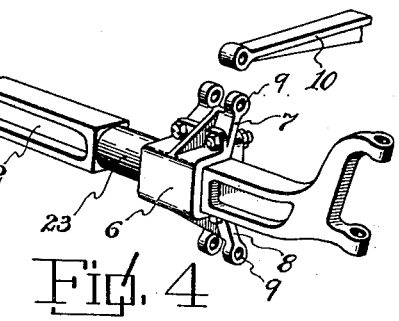
Balder G. Hill
INVENTOR
BY Philip A. H. Jewell
ATTORNEY Patented Aug. 10, 1937

2,089,607

UNITED STATES PATENT OFFICE 2,089,607

AXLE CONTROLLING DEVICE

Balder G. Hill, Tulsa, Okla., assignor of one-half to E. M. Thompson, Tulsa, Okla.

Application November 26, 1935, Serial No. 51,703

4 Claims. (Cl. 280—124)

The invention relates to axle controlling devices, and has for its object to provide a link connection between a spring carried axle and a vehicle frame and constructed in a manner whereby as the spring flexes on bound and rebound incident to the vehicle going over rough ground, the caster of the axle will be maintained during its upward and downward movement.

A further object is to provide an axle with a rearwardly extending link anchored to the frame of a vehicle and having a parallel movement whereby as the axle moves upwardly and downwardly with the spring during the spring flexing operation, the adjusted caster of the axle will be maintained thereby obviating the twisting action now experienced with single bar links and where no link at all is used.

A further object is to provide means whereby the centers of the parallel movement may be adjusted or moved and held for adjusting the caster of the axle so that said caster will be maintained during further upward and downward movement of the axle.

A further object is to provide the axle with upwardly and downwardly extending arms having link connections with upwardly and downwardly extending arms carried by the vehicle frame and forming a parallel link connection between the frame and axle, whereby the caster of the axle will be maintained, thereby obviating loss of speed and tire wear incident to the vibrating twisting of the axle on its longitudinal axis as the vehicle goes over the ground and insuring an equal distribution of the strain to the vehicle frame.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the device showing the same applied to the forward end of a vehicle frame, and one end of an axle.

Figure 2 is a side elevation of the device and the forward end of a vehicle frame or chassis, showing the upper movement of the device in dotted lines.

Figure 3 is a collective detail perspective view of the chassis carried parts.

Figure 4 is a collective perspective view of one end of the axle, showing the bracket carried thereby and one end of one of the parallel links.

Figure 5 is a vertical transverse sectional view through the chassis carried parts.

Referring to the drawing, the numeral 1 designates the forward end of a conventional form of automobile frame and 2 the axle carried thereby. The device hereinafter set forth is adapted to be applied to both sides of the automobile frame, however for purposes of illustration one side only is shown. The axle 2 is provided with a conventional form of spring holding device 3, through which the semi-elliptical spring 4 extends. The ends of the spring 4 are connected to the frame 1 by means of links 5, which allow longitudinal spreading of the spring as it moves upwardly during the bound and rebound, as clearly shown in dotted lines in Figure 2. It has been found that under ordinary structures as the spring flexes the caster of the axle varies at all times, thereby increasing vibrations, reducing the speed and transmitting the vibrations to the frame. This is true to a certain extent, even where a single link connection is used between the axle and the frame, as it is obvious the caster of the axle will vary as it swings on an arc by the single link. To overcome all of these difficulties applicant provides a link connection between the axle and the frame which has a parallel movement, thereby holding the axle to an adjusted caster throughout its upward and downward movement.

Clamped by means of a separable clamp 6 on the square portion of the axle 2 is a rigid member having an upwardly extending arm 7, and a downwardly extending arm 8 to the outer ends of which are pivotally connected at 9 rearwardly and upwardly extending parallel links 10. The rear ends of the links are pivotally connected at 11 to the upwardly extending arms 12 and the downwardly extending arms 13 of the collar 14, which in turn is mounted on the rectangular shaped portion 15 of a rock shaft 16.

The rock shaft 16 is rockably mounted in the lower end of the plate 17, secured to the side of the vehicle frame 1, and is provided with a locked nut 18, the purpose of which will presently appear. Also mounted on the rectangular portion 15 of the rock shaft 16 and rotatable therewith is an upwardly extending arm 19, the upper end of which terminates between set screws 20 carried by the plate 17, which set screws are adapted to cooperate with the arm 19 for rocking the rock shaft 16 to any position for adjusting the caster of the axle 2 through the parallel link connection.

Plate 17 is preferably provided with a scale 21 for indicating the caster, therefore it will be seen that the axle caster can be adjusted from a remote position. After the caster adjustment, the nut 18 is tightened for preventing rotation of the rock shaft 16 and relieving the strain from the pointer 19.

It will be noted that after the adjusting of the link, there is a parallel movement formed by the links 10 which will positively control the caster of the axle 2 in its upward and downwardly movement, and which will maintain the adjusted caster at all times, thereby preventing an arcuate movement of the axle or a vibrating twisting movement. The parallel links 10 are preferably connected together by a bar 22 pivotally connected thereto for bracing the links and preventing bending thereof.

From the above it will be seen that a parallel link connection is provided between a vehicle axle and vehicle frame which will positively maintain the caster of the axle in its upward and downward movement and preventing a twisting action thereof on the spring at all times. It will also be seen that means is provided whereby the caster of the axle may be adjusted if desired. The axle 2 is provided with a cylindrical portion 23, which is rotatably mounted in the spring perch or bracket 3, therefore it will be seen that there is a rotation of the axle in the bracket 3 during the caster adjustment.

By providing a caster preventing device as above set forth, it will be seen that the wear on the tires of the front wheels will be reduced to a minimum, the vehicle made easy of steering, the front wheels prevented from shimmie, road weave prevented and the car prevented from wandering.

The invention having been set forth what is claimed as new and useful is:

1. The combination with a vehicle axle having a spring connection with a frame, a plate carried by the frame, of a parallel link connection between the plate and axle, said plate having pivotally mounted therein a rock shaft to which one end of the link connection is connected, an arm carried by the rock shaft and adjusting screws cooperating with the arm and forming means whereby the rock shaft may be held at various adjusted positions for varying the caster of the axle.

2. The combination with a vehicle axle rotatably mounted in a spring carried bracket, a vehicle frame to which the spring is connected, of a parallel link connection between the axle and the frame, said link connection comprising spaced bars, upwardly and downwardly extending arms carried by the axle, a plate carried by the frame, upwardly and downwardly extending arms carried by a rock shaft mounted in the plate and connected to the link bars, an arm carried by the rock shaft, means cooperating with said last named arms for adjusting the rock shaft to various positions and means for holding the rock shaft against movement after an adjusting operation.

3. A device as set forth in claim 1 including a link connection between the bars of the parallel link connection and forming bracing means therefor.

4. The combination with a vehicle axle, a vehicle frame, a spring connecting said axle and frame, of a double link connection between the axle and frame, said link connection comprising upwardly and downwardly extending arms carried by the axle and movable therewith, upwardly and downwardly extending arms pivotally mounted on the frame and fixed in relation to the axle, links connecting the upwardly and downwardly extending arms carried by the axle and frame and means carried by the frame and cooperating with the frame carried arm for changing and anchoring at different positions said last named arms and through the double link connection the arms carried by the axle for varying the caster of the axle.

BALDER G. HILL.